United States Patent [19]

Grimm et al.

[11] 4,122,589
[45] Oct. 31, 1978

[54] METHOD OF PRODUCING AXIAL ROLLER BEARING CAGES

[75] Inventors: Robert Grimm, Herzogenaurach; Hartmut Koschmieder, Erlangen, both of Germany

[73] Assignee: Industriewerk Schaeffler OHG, Herzogenaurach, Germany

[21] Appl. No.: 800,949

[22] Filed: May 26, 1977

[30] Foreign Application Priority Data

Jun. 12, 1976 [DE] Fed. Rep. of Germany ....... 2626398

[51] Int. Cl.² .................. B21D 53/12; B21H 1/12
[52] U.S. Cl. ................. 29/148.4 C; 72/167
[58] Field of Search .......... 72/167, 136, 179, 199, 72/94, 180, 102, 177, 111, 196–198; 29/148.4 C, 149.5 S, 148.4 R

[56] References Cited

U.S. PATENT DOCUMENTS

| 330,611 | 11/1885 | Oar | 72/196 |
| 409,048 | 8/1889 | Larkin | 72/177 |
| 3,526,026 | 9/1970 | Warchol | 29/148.4 C |

FOREIGN PATENT DOCUMENTS

| 992,363 | 7/1951 | France | 72/167 |
| 280,514 | 12/1930 | Italy | 72/167 |
| 569,574 | 5/1945 | United Kingdom | 72/167 |

Primary Examiner—Milton S. Mehr
Attorney, Agent, or Firm—Hammond & Littell

[57] ABSTRACT

A method for the production of an axial roller bearing cage comprising applying pressure transverse to its longitudinal direction along the entire longitudinal extent of one end flange of a flat cage strip of plastically deformable material with two spaced end flanges connected by a plurality of crossbars to form pockets for receiving rollers and an apparatus for effecting the said method.

5 Claims, 2 Drawing Figures

METHOD OF PRODUCING AXIAL ROLLER BEARING CAGES

STATE OF THE ART

A method of producing an axial roller bearing cage is known wherein either end flange of a flat cage strip is lengthened in the area of every other pocket or the other end flange is shortened and this method always leaves every other cage pocket undeformed after the deformation while the other pockets are changed by the lengthening or shortening one of the end flanges relative to its original form and is thus no longer suitable for receiving rollers. In axial cages produced in this fashion, only half of the originally available pockets are suitable for receiving rollers which results in a considerable reduction of the load capacity of the bearing.

OBJECTS OF THE INVENTION

It is an object of the invention to provide a method of producing an axial roller bearing cage from a flat cage strip which permits use of all pocket openings existing in the flat cage strip to receive rollers in the finished state of the axial cage.

It is another object of the invention to provide a novel apparatus for producing axial roller bearing cages from a flat cage strip.

These and other objects and advantages of the invention will become obvious from the following detailed description.

THE INVENTION

The novel method of the invention for the production of an axial roller bearing cage comprises applying pressure transverse to its longitudinal direction along the entire longitudinal extent of one end flange of a flat cage strip of plastically deformable material with two spaced end flanges connected by a plurality of crossbars to form pockets for receiving rollers. In contrast to the known methods where one end flange was lengthened only in the area of every second cage pocket, lengthening according to the invention is effected in the area of each cage pocket. To obtain the same radius of curvature, far less lengthening is required in the area of each cage pocket than that has to be effected by the known method of every second cage pocket. The deformation in the area of each cage pocket is thus so small that it has no adverse effect on the guidance of the rollers, assuming a relatively large cage diameter is intended, and only the pocket play of the individual rollers is slightly increased.

If an axial roller bearing with a relatively small diameter is to be produced by this method, the deformation in the area of the individual cage pocket is naturally more pronounced. An originally rectangular cage pocket becomes then substantially trapezoidal which can naturally no longer provide adequate guidance for a cylindrical roller. This can be compensated for, however, by extending the pressure applied for lengthening one end flange into the adjoining area of the crossbars starting from this end flange. This way, not only is the end flange lengthened, but the individual crossbars are widened in the circumferential direction at this end by the pressure. This results in a contour of the individual pocket cage which is so constricted by the deformation of the crossbars, despite the trapezoidal deformation of the crossbars that the cylindrical rollers are guided with sufficient precision.

But it is also possible, by the application of the method of the invention, to exert a pressure on the second end flange also which pressure is less, however, than the pressure exerted on the first end flange. This lengthening of the entire cage strips, where the curvature is obtained simultaneously by the lengthening one flange, is of importance when an axial cage with a certain radius of curvature is to be produced from a flat cage strip of a certain length.

For carrying out the required deformation, the flat cage strip can be conducted between a pair of rolls which exert a deformation pressure on the cage strip in the area of one end flange and of the adjacent crossbar region.

In such a device it was found expedient to provide the rolls in the area in which they are to exert a deformation pressure on the cage strip with a pronounced surface structure, e.g. corrugation or knurling etc on its surface.

Referring now to the drawings

Figure 1:
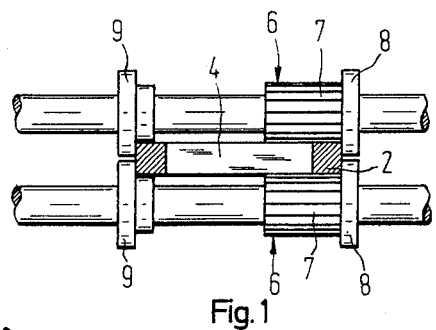
FIG. 1 is a cross-section through one embodiment of the invention in which the flat cage strip is mounted in the deformation apparatus.

The flat cage strip 1 is comprised of end flanges 2 and 3 connected by a plurality of crossbars 4 to form originally rectangular pockets 5 for receiving rollers 11 represented by dot-dash lines. This flat cage strip 1 is conducted through a pair of identical rolls 6 which have in the area of one end flange 2 and of the adjoining area of the crossbar 4 a corrugated area 7 with which they press on the cage. Adjoining this region laterally is a guide collar 8 and at the opposite end are likewise provided collar guides 9.

Figure 2:
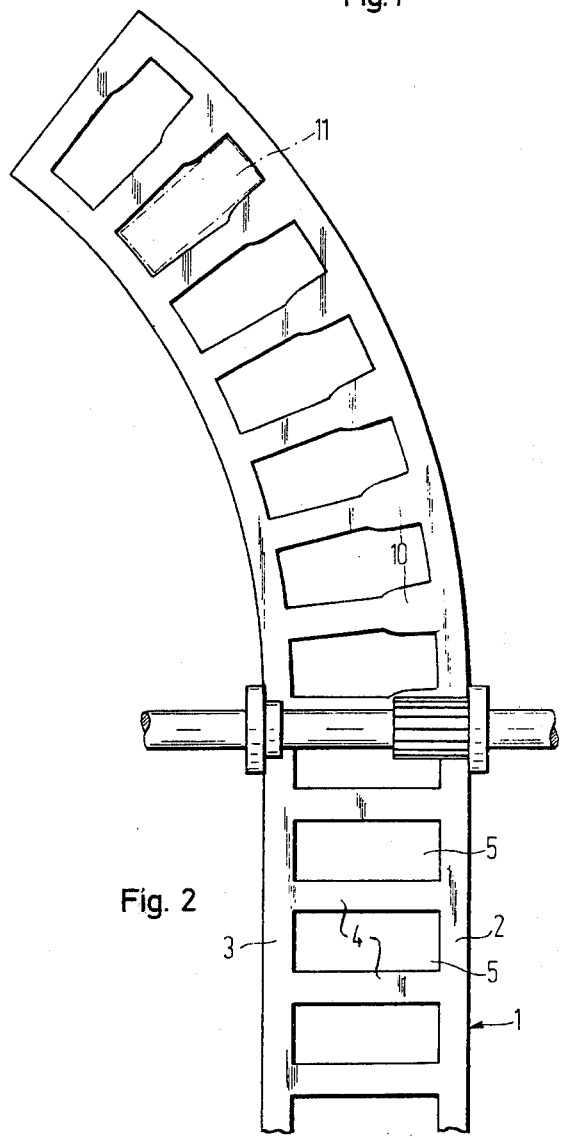
FIG. 2 is a plane view of a flat cage strip partially deformed.

FIG. 2 shows the deformation of the cage strip which results when it is conducted from the top to the bottom through these rolls 6. The lengthening in the area of one end flange 2 yields the curvature of the cage strip to the left and, due to the fact that the corrugated areas 7 of the rolls 6 extend into the area of the crossbars 4 adjoining end flange 2, these crossbars 4 are widened in the area of their ends 10. The roller 11, represented in dot-dashed lines, shows that satisfactory guidance of the roller is ensured by the widened crossbar ends 10.

The apparatus shown in the drawings can be modified depending on the requirements. Thus e.g. corrugated areas or areas with any other surface structure which exert a lower pressure on the end flange 3, can be provided adjoining the guide collars 9. It is also possible to extend the roller area 7 provided with a surface structure over the entire range between the guide collars 8 and 9, which areas would then have to be slightly conical. Likewise, it is possible to design individual sectors of the roller area provided with a surface structure with larger diameters to obtain additional deformations on the crossbars.

The invention is applicable to flat cages of any type of plastically deformable material such as steel, brass, aluminum, plastic, etc. According to the invention, a flat cage strip can be deformed to a complete axial roller bearing cage. But it is also possible to deform individual flat cage sectors which can be joined with each other at their ends by known means.

Within the framework of the invention, it is not only possible to start for the production of an axial roller bearing cage from a flat cage strip, whose end flanges are straight in the original state, but also from a cage strip which already has a certain curvature. If, starting from a cage strip that can form an axial cage with a certain diameter, a cage with a different diameter is to be produced, one end flange in such a cage strip can be subjected in the sense of the invention to a pressure along its entire longitudinal extent to either increase in this way the original curvature of the cage strip or to reduce it by applying the pressure on the other end flange.

Various other modifications of the invention may be made without departing from the spirit or scope thereof and it is to be understood that the invention is intended to be limited only as defined in the appended claims.

1. A method for the production of an axial cylindrical roller bearing cage provided with pockets comprising applying pressure transverse to its longitudinal direction along the entire longitudinal extent of one end flange of a flat cage strip of plastically deformable material with two spaced end flanges connected by a plurality of crossbars to form pockets with corners approximately defining the end points of a rectangle for receiving cylindrical rollers.

2. The method of claim 1 wherein the pressure on the end flange extends into the adjoining area of the crossbars starting from the end flange.

3. The method of claim 1 wherein a lower pressure is also applied to the second end flange.

4. The method of claim 1 wherein the flat cage strip is passed between a pair of rolls exerting in the area of one end flange and the crossbars adjoining it with a deformation about its entire longitudinal extent.

5. The method of claim 4 wherein a varying deformation is applied to the entire width of the flat cage strip.

* * * * *